United States Patent
Park et al.

(10) Patent No.: US 11,428,985 B2
(45) Date of Patent: Aug. 30, 2022

(54) LED LENS ARRAY FOR BACKLIGHT DEVICE AND DISPLAY DEVICE HAVING SAME

(71) Applicant: SAMSUNG ELECTRONICS CO., LTD., Suwon-si (KR)

(72) Inventors: Yeonkyun Park, Suwon-si (KR); Gonghee Lee, Suwon-si (KR); Taehee Jeon, Suwon-si (KR); Jongseong Kim, Suwon-si (KR); Youngwook Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/273,228

(22) PCT Filed: Aug. 9, 2019

(86) PCT No.: PCT/KR2019/010031
§ 371 (c)(1),
(2) Date: Mar. 3, 2021

(87) PCT Pub. No.: WO2020/060030
PCT Pub. Date: Mar. 26, 2020

(65) Prior Publication Data
US 2021/0191197 A1    Jun. 24, 2021

(30) Foreign Application Priority Data
Sep. 21, 2018  (KR) .................. 10-2018-0114302

(51) Int. Cl.
*G02F 1/1335* (2006.01)
*G02F 1/13357* (2006.01)
*F21V 5/00* (2018.01)

(52) U.S. Cl.
CPC ........ *G02F 1/133607* (2021.01); *F21V 5/007* (2013.01); *G02F 1/133603* (2013.01); *G02F 1/133608* (2013.01)

(58) Field of Classification Search
CPC ......... G02F 1/133604; G02F 1/133606; G02F 1/133607; G02F 1/133608;
(Continued)

(56) References Cited

U.S. PATENT DOCUMENTS 8,348,461 B2    1/2013  Wilcox et al.
2012/0063141 A1*  3/2012  Otsuka .................. F21V 5/007
                                              362/268
(Continued)

FOREIGN PATENT DOCUMENTS

JP    2008-096745 A    4/2008
JP    5615758 B2    10/2014
(Continued)

OTHER PUBLICATIONS

International Search Report dated Nov. 18, 2019 issued by the International Searching Authority in counterpart International Application No. PCT/KR2019/010031 (PCT/ISA/210).
(Continued)

Primary Examiner — Erin Kryukova
(74) Attorney, Agent, or Firm — Sughrue Mion, PLLC

(57) ABSTRACT

An LED lens array for a direct type backlight device, according to the present disclosure, comprises: a plurality of LED lenses disposed on a plane; and a plurality of lens strings connecting the plurality of LED lenses, wherein each of the plurality of lens strings extends from each side of each of the plurality of LED lenses, and is configured to allow light emitted from each of the plurality of LED lenses to pass therethrough, wherein the width of each of the plurality of lens strings is smaller than the diameter of each of the plurality of LED lenses.

12 Claims, 21 Drawing Sheets

(58) Field of Classification Search
CPC .. G02F 1/133611; F21V 5/007; F21V 7/0081; F21V 7/0091; G02B 19/0066; G02B 19/0028; G02B 3/0056; G02B 3/0075; G02B 3/005; G02B 6/0061; G02B 6/0066; G02B 6/0073; F21Y 2105/10; F21Y 2105/16
See application file for complete search history.

(56) References Cited

U.S. PATENT DOCUMENTS

| | | | | |
|---|---|---|---|---|
| 2013/0314899 | A1* | 11/2013 | Ye | G09F 13/22 362/97.1 |
| 2014/0118990 | A1* | 5/2014 | Ki | G09F 9/33 362/84 |
| 2018/0175264 | A1 | 6/2018 | Lee et al. | |

FOREIGN PATENT DOCUMENTS

| | | | |
|---|---|---|---|
| JP | 5819839 | B2 | 11/2015 |
| KR | 10-0949645 | B1 | 3/2010 |
| KR | 10-2011-0124882 | A | 11/2011 |
| KR | 10-1078218 | B1 | 11/2011 |
| KR | 10-2015-0069195 | A | 6/2015 |
| KR | 10-1747340 | B1 | 6/2017 |
| KR | 101747340 | B1 * | 6/2017 |

OTHER PUBLICATIONS

International Written Opinion dated Nov. 18, 2019 issued by the International Searching Authority in counterpart International Application No. PCT/KR2019/010031 (PCT/ISA/237).

* cited by examiner

LED LENS ARRAY FOR BACKLIGHT DEVICE AND DISPLAY DEVICE HAVING SAME

TECHNICAL FIELD

This disclosure relates to a backlight device used for a display device. More particularly, this disclosure relates to a light emitting diode (LED) lens array used for an LED display device.

BACKGROUND ART

A liquid crystal display (LCD) used in a display device includes a backlight device which emits light uniformly on a liquid crystal display, since the LCD itself may not emit light.

In general, a backlight device used in a liquid crystal display is classified into an edge type backlight device and a direct type backlight device according to a position of a light source. The edge type backlight device has a light source positioned in one side or both sides of a light guide plate and has a structure for irradiating light into a light guide plate. The direct type backlight device has a structure where a light source is arranged on a lower portion of a diffuser plate to irradiate the light to an overall portion of the diffuser plate.

As a light source, a light emitting diode (LED) is widely used recently. In the case of a direct type backlight device, a plurality of LEDs are disposed on an upper surface of a printed circuit board at predetermined intervals. An LED lens is installed on an upper side of the plurality of LEDs to diffuse light emitted from the LEDs. Therefore, when a backlight device is manufactured, one LED lens is installed on an upper part of one LED.

As a size of a display device becomes gradually larger, the number of LEDs installed on a printed circuit board increases, an operation of installing an LED lens on each of a plurality of LEDs provided on a printed circuit board has a problem of requiring a lot of man hour. Also, when a plurality of LED lenses are installed in a plurality of LEDs, there is a problem in that an LED lens may be distorted on the LED.

DISCLOSURE

Technical Problem

The disclosure has been made to solve the above-described problems, and an object of the disclosure is to provide an LED lens array for a backlight device capable of reducing the number of parts to reduce man hour for attaching an LED lens, and a display device including the same.

According to another aspect of the disclosure, an LED lens array for a backlight device and a display device including the same are provided to reduce the distortion of an LED lens relative to an LED by connecting a plurality of LED lenses at predetermined intervals.

Technical Solution

According to an aspect of the disclosure, a light emitting diode (LED) lens array for a backlight device may include a plurality of LED lenses disposed on a plane and a plurality of lens strings connecting the plurality of LED lenses, and each of the plurality of lens strings may extend from side surfaces of each of the plurality of LED lenses, and is configured to allow light emitted from each of the plurality of LED lenses to pass therethrough, wherein a width of each of the plurality of lens strings may be smaller than a diameter of each of the plurality of LED lenses.

The plurality of lens strings may be provided with a supporting member in a direction where the plurality of LED lenses protrude.

The supporting member may be formed of a conical shape that an upper end has a small area and a lower end has a large area.

A portion of the lens string corresponding to a lower end of the supporting member may be provided with a reflector reflecting light guided through the lens string toward the supporting member.

Each of the plurality of lens strings may be formed to guide light emitted from first LED lens among the first LED lens and second LED lens connected each other to the second LED lens and guide light emitted from the second LED lens to the first LED lens.

Each of the plurality of lens strings may be formed to emit a part of light emitted from first LED lens among the first LED lens and second LED lens connected each other to an outside, guide remaining light to the second LED lens, emit a part of the light emitted from the second LED lens to an outside, and guide remaining light to the first LED lens.

The plurality of LED lenses may be disposed in a row, and each of the plurality of lens strings may be provided as a rod in a straight line shape between two adjacent LED lenses among the plurality of LED lenses.

The plurality of LED lenses may be disposed in a cross shape, and the plurality of lens strings may be formed in a cross shape.

A supporting member may be provided at a center of the plurality of lens strings formed in a cross shape in a direction where the plurality of LED lenses protrude.

A central LED lens may be provided at a center of the plurality of lens strings formed in a cross shape.

A supporting member may be provided in the plurality of lens strings at one side of the central LED lens in a direction where the plurality of LED lenses protrude.

The plurality of lens strings may include a vertical lens string configured to connect two LED lenses adjacent in a vertical direction among the plurality of LED lenses and a plurality of horizontal lens strings that are extended to left and right from the two LED lenses connected to the vertical lens string, and connect two LED lenses adjacent in a horizontal direction among the plurality of LED lenses, respectively.

The vertical lens string may be provided with a supporting member in a direction where the plurality of LED lenses protrude.

The plurality of lens strings may further include an extension vertical lens string configured to connect an LED lens spaced apart from one of the two LED lenses connected by the vertical lens string and an extension horizontal lens string configured to be extended from the LED lens connected to the extension vertical lens string, and connect two LED lenses adjacent in a horizontal direction to be parallel with the horizontal lens string.

According to another aspect, a display device includes a lower chassis, a printed circuit board that is installed at an upper surface of the lower chassis and provided with a plurality of LEDs, and an LED lens array for a backlight device installed on the printed circuit board to cover the plurality of LEDs, and the LED lens array for the backlight device may include a plurality of LED lenses to cover the plurality of LEDs and a plurality of lens strings for connecting the plurality of LED lenses, and each of the plurality of lens strings is extended from side surfaces of each of the plurality of LED lenses, formed so as to enable light emitted from each of the plurality of LED lenses to pass therethrough, and a width of the plurality of lens strings may be smaller than a diameter of each of the plurality of LED lenses.

The display device may further include a diffuser plate installed at an upper side of the plurality of LEDs, and the plurality of lens strings may be provided with a supporting member for supporting the diffuser plate in a direction where the plurality of LED lenses protrude.

Effect of Invention

According to an embodiment, an LED lens array for a backlight device having a structure as described above may form one part with a plurality of LED lenses, thus capable of decreasing the number of parts and reducing man hour for assembling an LED lens.

BEST MODE FOR CARRYING OUT THE INVENTION

Embodiments of an LED lens array for a backlight device and a display device including same will be described with reference to the attached drawings.

Examples described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

Terms such as first and second may be used to describe various components, but the components should not be limited by the terms. The terms may be used only for the purpose of distinguishing one component from another component. For example, without departing from the scope of the present disclosure, the first component may be referred to as the second component, and similarly the second component may also be referred to as the first component.

Terms used in the embodiments of the disclosure may be interpreted as meanings commonly known to those of ordinary skill in the art unless otherwise defined.

In addition, terms such as "front end", "back end", "upper portion," "lower portion", "upper end", "lower end," or the like, used in the disclosure are defined based on the drawings, and by each term, the shape and location of each component is not limited.

An LED lens array for a direct type backlight device will be described with reference to FIGS. 1 to 3.

Figure 1:
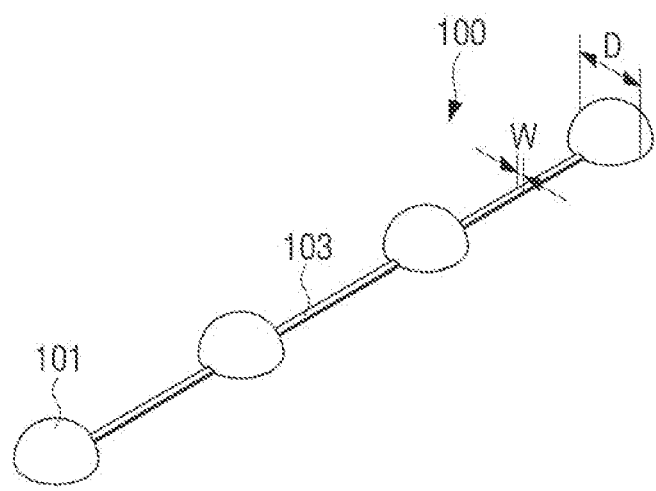
FIG. 1 is a perspective view illustrating an LED lens array for a direct type backlight device according to an embodiment.

FIG. 1 is a perspective view illustrating an LED lens array for a direct type backlight device according to an embodiment. FIG. 2 is a perspective view illustrating an LED lens array for a direct type backlight device according to another embodiment. FIGS. 3A to E are cross-sectional views illustrating example of a lens string of an LED lens array for a direct type backlight device according to an embodiment.

Figure 2:
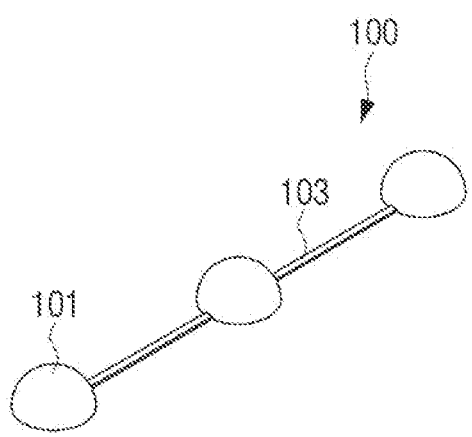
FIG. 2 is a perspective view illustrating an LED lens array for a direct type backlight device according to another embodiment.
Figure 3:
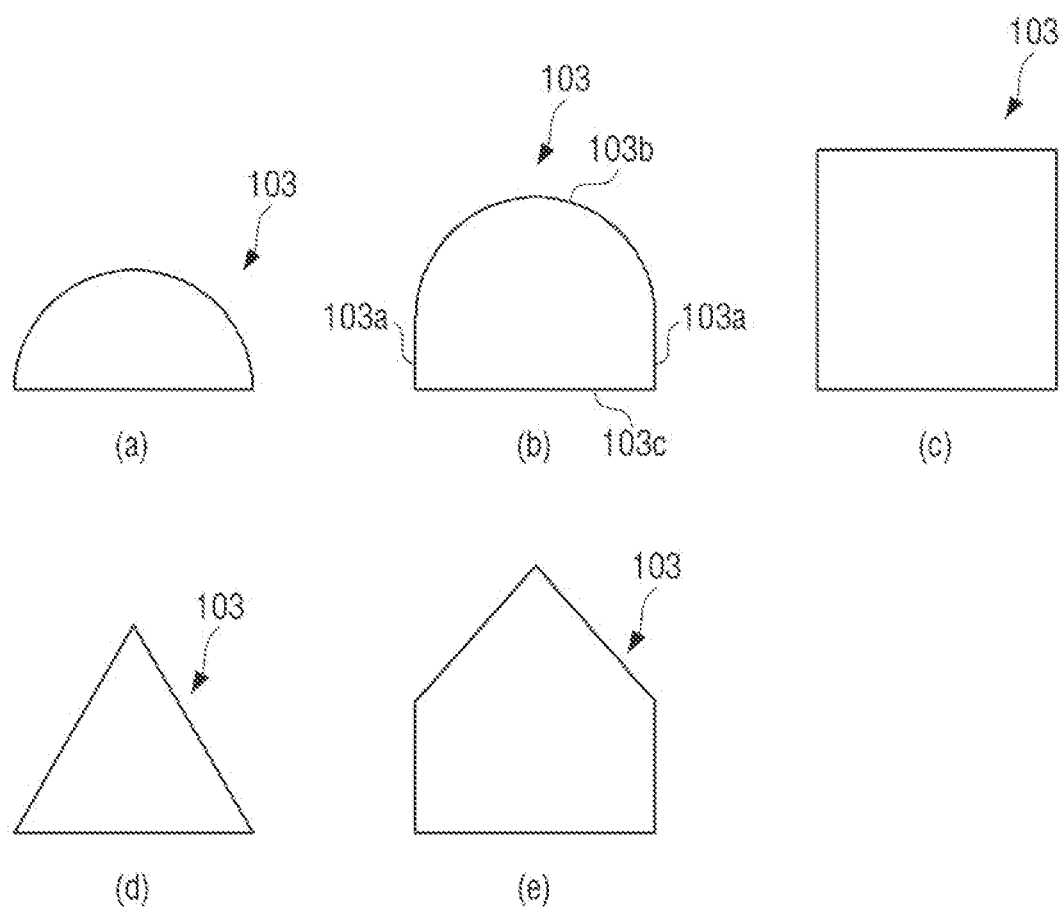
FIGS. 3A to E are cross-sectional views illustrating example of a lens string of an LED lens array for a direct type backlight device according to an embodiment.

Referring to FIGS. 1 and 2, an LED lens array 100 for a direct type backlight device according to an embodiment may include a plurality of LED lens 101 and a plurality of lens strings 103.

The plurality of LED lenses 101 are arranged on a plane. Specifically, the plurality of LED lenses 101 may be installed to cover an upper portion of the plurality of LEDs (see FIG. 18) disposed on an upper surface of a printed circuit board 41 (see FIG. 18). Since an upper surface of the printed circuit board 41 is formed in a plane, the plurality of LED lenses 101 may be disposed on a plane. The plurality of LED lenses 101 may be formed in the same size and shape.

Figure 4:
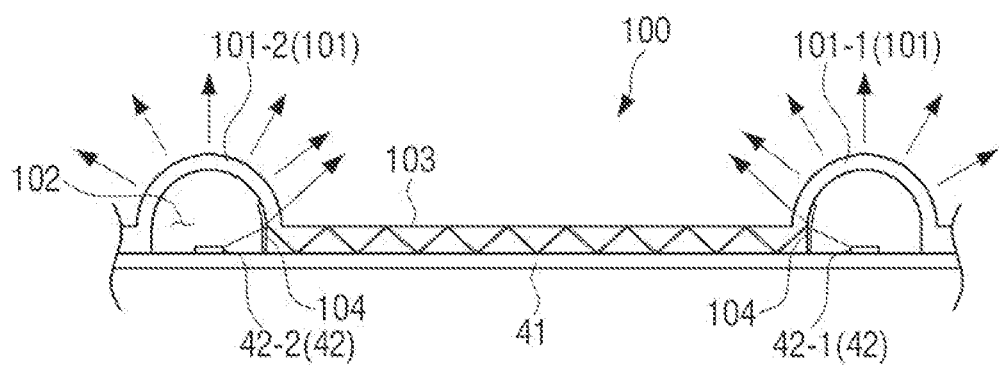
FIG. 4 is a partial cross-sectional view illustrating a state of guiding light through a lens string of an LED lens array for a direct type backlight device according to an embodiment.

The LED 42 may be implemented with an LED package including an LED chip emitting light and a package for sealing the LED chip. The LED lens 101 may be installed on the upper side of the LED 42, as shown in FIG. 4, and diffuse the light emitted from the LED 42. Therefore, an accommodating space 102 in which an LED 42 is received may be provided inside the LED lens 101.

The plurality of lens strings 103 may be arranged to connect the plurality of LED lenses 101. Each of the plurality of lens strings 103 may extend from each side of the plurality of LED lenses 101. Specifically, one lens string 103 is formed to connect two LED lenses 101. The lens string 103 may be formed to allow light emitted from the LED lens 101 to pass therethrough. A width (W) of the lens string 103 is formed to be less than a diameter (D) of the LED lens 101.

The lens string 103 may be formed in various cross-sections as long as light may be passed. For example, as shown in FIG. 3A, the lens string 103 may be formed to have a semi-circular cross-section. As shown in FIG. 3B, the lens string 103 may be formed as a cross-sectional shape such that both side surfaces 103*a* are straight lines parallel to each other, an upper surface 103*b* is an arc, and a bottom surface 103*c* is a straight line. Alternatively, the lens string 103 may be formed to have a rectangular or triangular shaped cross-section as shown in FIGS. 3C and 3D. Alternatively, as illustrated in FIG. 3E, the lens string 103 may be formed to have a rectangular cross-section.

A lower surface of the lens string 103 may be formed to be located on the same plane as the lower surface of the two LED lenses 101 connected to each other. The lens string 103 may be formed of the same material as the LED lens 101. Accordingly, the plurality of lens strings 103 may be manufactured with a plurality of LED lenses 101 through single injection process.

The plurality of LEDs may be arranged in various patterns on the upper surface of the printed circuit board 41 so that the plurality of LED lenses 101 may be disposed to correspond to the array patterns of the plurality of LEDs 42. An LED lens array (hereinafter, referred to as an LED lens array) for a direct type backlight device according to an embodiment may variously form a plurality of lens strings 103 so as to connect a plurality of LED lenses 101 arranged in various patterns.

As an example, the plurality of lens strings 103 may be formed as a straight line as illustrated in FIG. 1.

Referring to FIG. 1, the plurality of LED lenses 101 may be arranged in a row. The plurality of LED lenses 103 may be arranged to cover the plurality of LEDs 42 disposed in a row. Each of the plurality of lens strings 103 may be provided as a straight line-shaped rod between the two adjacent LED lenses 101 among the plurality of LED lenses 101. To be specific, one lens string 103 connecting two LED lenses 101 may be formed as a straight line rod.

In the embodiment illustrated in FIG. 1, the LED lens array 100 is formed of four LED lenses 101 and three lens strings 103. The number of LED lenses 101 and the lens strings 103 forming the LED lens array 100 is not limited thereto.

As illustrated in FIG. 2, the LED lens array 100 may be formed of three LED lenses 101 and two lens strings 103.

Though not illustrated, the LED lens array 100 may be formed so as to connect two LED lenses 101 or five or more LED lenses 101 to at least one lens string 103.

The lens string 103 may be formed so as to guide light emitted from each of two connected LED lenses 103, that is, the first LED lens and the second LED lens, to another LED lens. For example, the lens string 103 may be formed to guide light emitted from the first LED lens to the second LED lens and guide light emitted from the second LED lens to the first LED lens.

FIG. 4 is a partial cross-sectional view illustrating a state of guiding light through a lens string of an LED lens array for a direct type backlight device according to an embodiment.

Referring to FIG. 4, light emitted from a first LED 42-1 installed at the printed circuit board 41 is emitted toward an upper side through the first LED lens 101-1. A part of light emitted from the first LED 42-1 is refracted toward the lens string 103 from the part of the first LED lens 101-1 where the lens string 103 is provided. The light which is refracted and incident on the lens string 103 may go through total reflection inside the lens string 103 and move to the second LED lens 101-2, and may be emitted to an upper side through the second LED lens 101-2. At a portion of the first LED lens 101-1 connected to the lens string 103, a refractor 104 104 which refracts the light emitted from the first LED 42-1 to be incident on the lens string 103 may be provided.

The light emitted from a second LED 42-2 installed on the printed circuit board 41 is emitted toward the upper side through the second LED lens 101-2. A portion of the light emitted from the second LED 42-2 is refracted toward the lens string 103 at a portion of the second LED lens 101-2 provided with the lens string 103. The light which is refracted and incident on the lens string 103 may be totally reflected from the inside of the lens string 103 and move to the first LED lens 101-1, and may be emitted to an upper side through the first LED lens 101-1. At a portion of the second LED lens 101-2 connected to the lens string 103 may be provided with the refractor 104 for refracting light emitted from the second LED 42-2 to be incident on the lens string 103.

Figure 5:
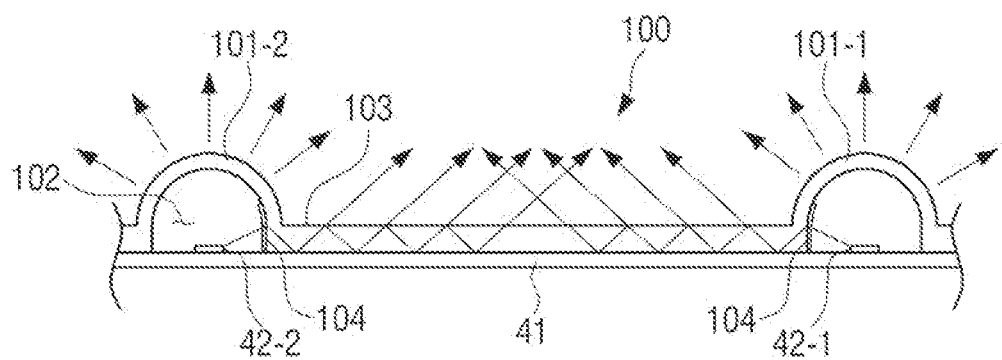
FIG. 5 is a partial cross-sectional view illustrating a state of guiding light through a lens string of an LED lens array for a direct type backlight device according to an embodiment.

As another example, as illustrated in FIG. 5, the lens string 103 may be formed so that light emitted from the LED lens 101 is emitted toward the upper side through the lens string 103.

FIG. 5 is a partial cross-sectional view illustrating a state of guiding light through a lens string of an LED lens array for a direct type backlight device according to an embodiment.

Referring to FIG. 5, light emitted from the first LED 42-1 installed on the printed circuit board 41 is emitted toward an upper side through the first LED lens 101-1. A portion of light emitted from the first LED 41-1 may be refracted from the portion of the first LED lens 101-1 and is incident on the lens string 103. The incident light is emitted toward an upper side of the lens string 103 through the upper surface of the lens string 103 while moving toward the second LED lens 101-2 inside the lens string 103. At a portion of the first LED lens 101-1 connected with the lens string 103, the refractor 104 for refracting the light emitted from the first LED 42-1 to be incident on the lens string 103 may be provided.

The light emitted from the second LED 42-2 installed on the printed circuit board 41 is emitted toward an upper side through the second LED lens 101-2. A portion of light emitted from the second LED 42-2 may be refracted from a part of the second LED lens 101-2 provided with the lens string 103 and is incident on the lens string 103. The incident light is emitted toward an upper side of the lens string 103 through an upper surface of the lens string 103 while moving toward the first LED lens 101-1 from the inside of the lens string 103. At a portion of the second LED lens 101-2 connected to the lens string 103, the refractor 104 for refracting light emitted from the second LED 42-2 to be incident on the lens string 103 may be provided.

Figure 6:
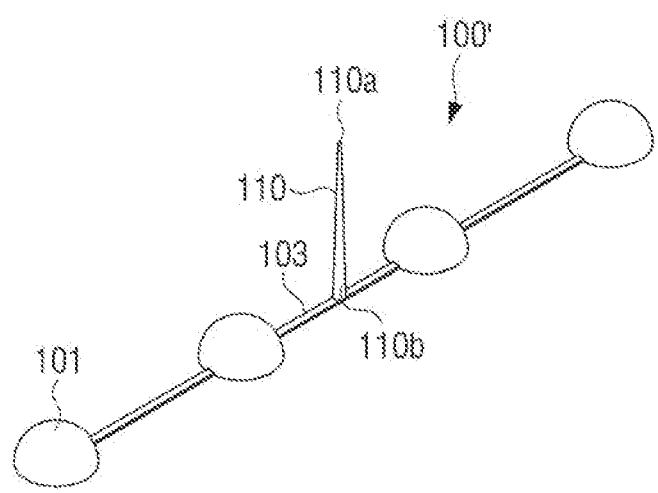
FIG. 6 is a perspective view illustrating an LED lens array for a direct type backlight device according to another embodiment.
Figure 7:
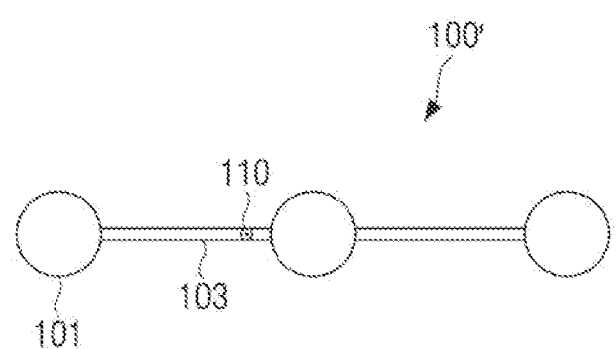
FIG. 7 is a plan view illustrating an LED lens array for a direct type backlight device according to another embodiment.
Figure 8:
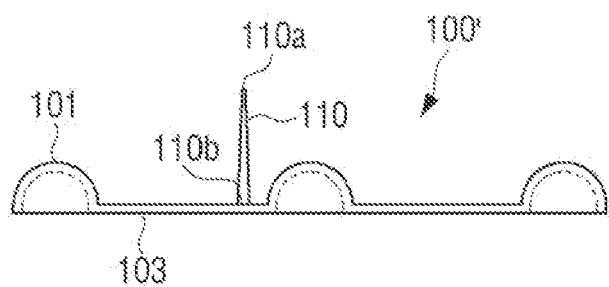
FIG. 8 is a side view of the LED lens array for a direct type backlight device of FIG. 7.

FIG. 6 is a perspective view illustrating an LED lens array for a direct type backlight device according to another embodiment. FIG. 7 is a plan view illustrating an LED lens array for a direct type backlight device according to another embodiment. FIG. 8 is a side view of the LED lens array for a direct type backlight device of FIG. 7.

Referring to FIG. 6, an LED lens array 100' according to another embodiment may include a plurality of LED lenses 101, a plurality of lens strings 103, and a supporting member 110.

The plurality of LED lenses 101 and the plurality of lens strings 103 are similar or the same as the embodiment described above and thus, detailed description will be omitted.

The supporting member 110 is formed to support a diffuser plate 21 (see FIG. 18) installed at an upper side of the plurality of LED lenses 101. The supporting member 110 is provided in one lens string 103 among a plurality of lens strings 103 forming the LED lens array 100'. The supporting member 110 is provided to extend from the lens string 103 in a direction where the plurality of LED lenses 101 protrude.

The supporting member 110 may be formed of a transparent material and may be formed in various shapes that can support a diffuser plate 21.

For example, as illustrated in FIGS. 6 and 8, the supporting member 110 may be formed as a conic shape. To be specific, the shape may be a conic shape such that an area of an upper end 110*a* of the supporting member 110 in contact with the diffuser plate 21 is narrow and an area of a lower end 110*b* of the supporting member 110 fixed to the lens string 103 is wide. The upper end 110*a* of the supporting member 110 is formed of a shape which is not pointed and had has a predetermined area to support the diffuser plate 21 and the support plate 110 may have a shape of a truncated cone.

In addition, though not illustrated, the supporting member 110 may be formed as a polygonal pyramid such as a triangular pyramid and a rectangular pyramid.

As illustrated in FIG. 6, when the LED lens array 100' includes an even number of LED lens 101, the supporting member 110 may be provided at a center of the LED lens array 100'. As another example, if the LED lens array 100' includes an odd number of LED lens 101, the supporting member 110 may be formed to be adjacent to the LED lens 101 located at the center of the LED lens array 100'.

Figure 9:
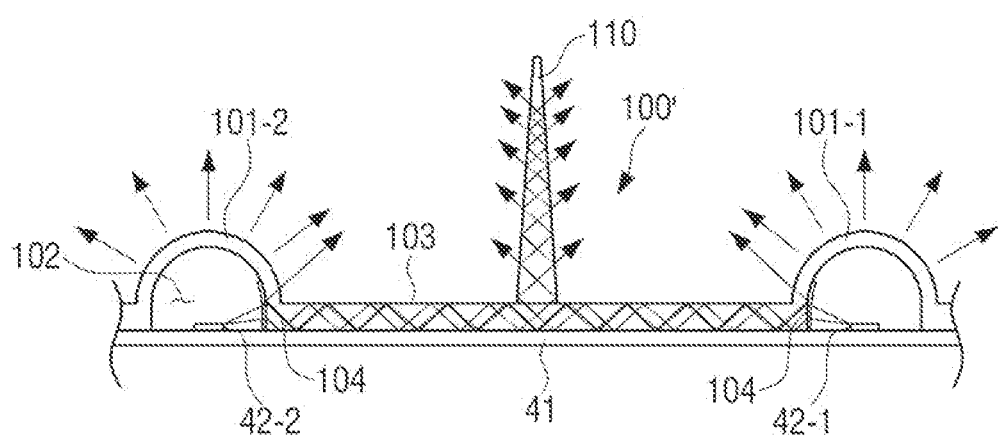
FIG. 9 is a partial sectional view illustrating a state of guiding light by the lens string and the supporting member of the LED lens array for a direct type backlight device according to another embodiment.

FIG. 9 is a partial sectional view illustrating a state of guiding light by the lens string and the supporting member of the LED lens array for a direct type backlight device according to another embodiment.

Referring to FIG. 9, light emitted from the first LED 42-1 installed at the printed circuit board 41 is emitted to an upper side through the first LED lens 101-1. A portion of light emitted from the first LED 42-1 is refracted toward the lens string 103 at the portion of the first LED lens 101-1 connected to the lens string 103. The light refracted and incident on the lens string 103 may be totally reflected inside the lens string 103 and move to the supporting member 110, and then emitted to the outside through the supporting member 110. A portion of light incident on the lens string 103 may not be incident on the supporting member 110, move to the second LED lens 101-2 and then may be emitted to an upper side through the second LED lens 101-2. At a portion of the first LED lens 101-1 connected to the lens string 103, the refractor 104 for refracting the light emitted from the first LED 42-1 to be incident on the lens string 103 may be provided.

The light emitted from the second LED 42-2 installed at the printed circuit board 41 is emitted to an upper side through the second LED lens 101-2. A portion of light emitted from the second LED 42-2 is refracted toward the lens string 103 at the portion of the second LED lens 101-2 connected to the lens string 103. The light refracted and incident on the lens string 103 may be totally reflected inside the lens string 103 and move to the supporting member 110, and then emitted to the outside through the supporting member 110. A portion of light incident on the lens string 103 may not be incident on the supporting member 110, move to the first LED lens 101-1 and then may be emitted to an upper side through the first LED lens 101-1. At a portion of the second LED lens 101-2 connected to the lens string 103, the refractor 104 for refracting the light emitted from the second LED 42-2 to be incident on the lens string 103 may be provided.

Referring to FIG. 9, a portion of light incident on the lens string 103 may be emitted to the outside through the supporting member 110, and remaining light may be emitted to an upper side through the opposite LED lenses 101-1 and 101-2, but as another example, all the light incident on the lens string 103 may be configured to be emitted to the outside through the supporting member 110.

Figure 10:
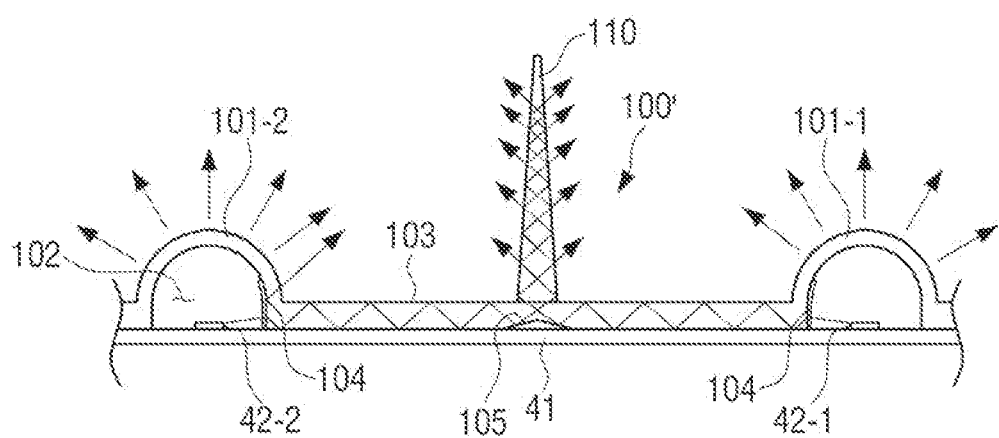
FIG. 10 is a partial sectional view illustrating a state of guiding light by the lens string and the supporting member of the LED lens array for a direct type backlight device according to another embodiment.

FIG. 10 is a partial sectional view illustrating a state of guiding light by the lens string and the supporting member of the LED lens array for a direct type backlight device according to another embodiment.

Referring to FIG. 10, the light emitted from the first LED 42-1 installed at the printed circuit board 41 may be emitted to an upper side through the first LED lens 42-1. A portion of the light emitted from the first LED 42-1 may be refracted at the portion of the first LED lens 101-1 connected to the lens string 103 and may be incident on the lens string 103. The light incident on the lens string 103 may be totally reflected at the inside of the lens string 103 and may move to the supporting member 110, and then may be emitted to the outside through the supporting member 110.

At a portion of the lens string 103 corresponding to a lower end of the supporting member 110, a reflector 105 for reflecting light guided through the lens string 103 toward the supporting member 110 may be provided. The light emitted from the first LED lens 101-1 and incident on the lens string 103 may all be reflected from the reflector 105 and incident on the supporting member 110, and then may be emitted to the outside through the supporting member 110. At a portion of the first LED lens 101-1 connected to the lens string 103, the refractor 104 for refracting the light emitted from the first LED 42-1 to be incident on the lens string 103 may be provided.

The light emitted from the second LED 42-2 installed in the printed circuit board 41 is emitted to an upper side through the second LED lens 101-2. At this time, a part of the light emitted from the second LED 42-2 may be refracted in the part of the second LED lens 101-2 connected to the lens string 103 to be incident on the lens string 103. The light incident on the lens string 103 is totally reflected in the lens string 103, moved to the support1 member 110, and then emitted to the outside through the supporting member 110. A reflector 105 to reflect the light guided through the lens string 103 toward the supporting member 110 is provided at a portion of the lens string 103 corresponding to the lower end 110b of the supporting member 110. Therefore, the light emitted from the second LED lens 101-2 and incident on the lens string 103 is reflected from the reflector 105 and incident on the supporting member 110, and then emitted to the outside through the supporting member 110. At a part of the second LED lens 101-2 connected to the lens string 103 may be provided with a refractor 104 which refracts the light emitted from the second LED 42-2 to be incident on the lens string 103.

As described above, according to the LED lens array 100' according to an embodiment, the light emitted from the LED lens 101 may be guided to the supporting member 110 through the lens string 103 and may be emitted to the outside through the supporting member 110, thereby improving a dark portion or a bright portion generated in the display apparatus by the supporting member 110.

It has been illustrated that the LED lens array 100, 100' are formed in a straight line shape, but the LED lens array may be formed in a cross shape. Hereinbelow, with reference to FIGS. 11 to 15, an LED lens array in a cross shape will be described in detail.

Figure 11:
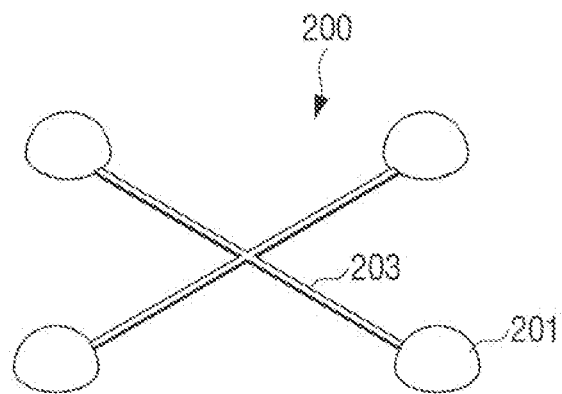
FIG. 11 is a perspective view illustrating the LED lens array for a direct type backlight device according to another embodiment.

FIG. 11 is a perspective view illustrating the LED lens array for a direct type backlight device according to another embodiment.

Referring to FIG. 11, the LED lens array 200 may include a plurality of LED lenses 201 and a plurality of lens strings 203.

The plurality of LED lenses 201 may be disposed in a cross shape. That is, the plurality of LED lenses 201 may be disposed in a cross shape to enable the plurality of LEDs 42 disposed in a cross shape on the printed circuit board 41 to be covered.

Each of the plurality of lens strings 203 may be installed between two facing LED lenses 201 of the plurality of LED lenses 201. The plurality of lens strings 203 may be formed of a cross shape.

For example, the LED lens array 200 shown in FIG. 11 includes four LED lenses 201 and two lens strings 203 connecting two LED lenses 201 facing each other. Therefore, two lens strings 203 are formed in a cross-shape.

As the lens string 103 of the embodiment shown in FIGS. 4 and 5, the two lens strings 203 of FIG. 11 may guide light emitted from two LED lenses 201 facing each other. Since the lens string 203 guiding the light is the same as or similar to the lens string 103 of the above-described embodiment, a detailed description thereof is omitted.

As another example, a supporting member 210 may be formed at a center where two lens strings 203 of the LED lens array 200' are crossing.

Figure 12:
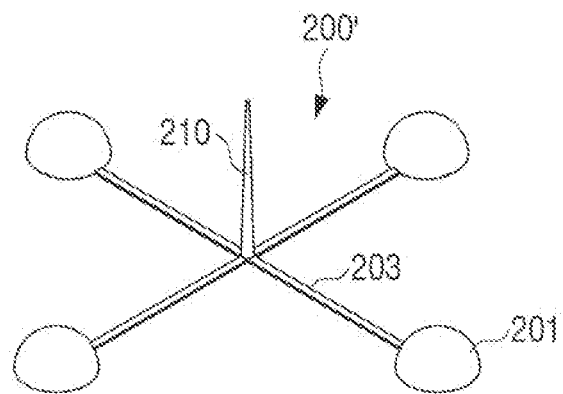
FIG. 12 is a perspective view illustrating the LED lens array for a direct type backlight device according to another embodiment.

FIG. 12 is a perspective view illustrating the LED lens array for a direct type backlight device according to another embodiment that a supporting member is formed at a center where two lens strings cross.

Referring to FIG. 12, the supporting member 210 is provided at the center of two lens strings 203 formed in a cross shape. The supporting member 210 is provided to extend from the lens string 203 in a direction where four LED lenses 201 protrude.

The supporting member 210 may be formed of a transparent material and may be formed in various shapes to support the diffuser plate 21. For example, as shown in FIG. 12, the supporting member 210 may be formed in a truncated cone shape. Specifically, the truncated cone shape may be that an area of the upper end of the supporting member 210 in contact with the diffuser plate 21 is narrow, and an area of the lower end of the supporting member 210 is wider.

As the lens string 103 of the embodiment of FIGS. 9 and 10, two lens strings 203 as illustrated in FIG. 12 may be formed to guide light emitted from two facing LED lenses 201 to the supporting member 210 installed at the center. Guiding light by two lens strings 203 is the same or similar to the lens string 103 of the embodiment described above and detailed description will be omitted.

As another example, an LED lens 205 may be formed at the center where two lens strings 203 of an LED lens array 200" are crossed. A central LED lens 205 may be provided at the center of the two lens strings 203 formed in a cross shape.

Figure 13:
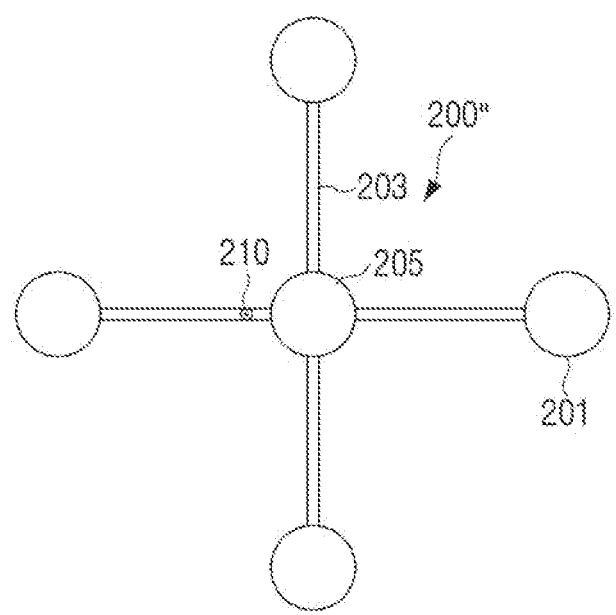
FIG. 13 is a plan view illustrating the LED lens array for a direct type backlight device according to another embodiment.

FIG. 13 is a plan view illustrating another example of the LED lens array for a direct type backlight device according to another embodiment in which a central LED lens is provided at the center where two lens strings cross.

Referring to FIG. 13, the LED lens array 200" according to an embodiment includes five LED lenses 201 and 205 and four lens strings 203.

The central LED lens 205 is connected to four LED lenses 201 disposed in a cross-shape by the four lens strings. Therefore, the light emitted from the central LED lens 205 may be guided to the four LED lenses 201 disposed therearound, through the four lens strings 203. The light emitted from the four LED lenses 201 may be emitted to the outside through the central LED lens 205 through the four lens strings 203.

One of the four lens strings 203 may be formed with the supporting member 210 supporting the diffuser plate 210. The supporting member 210 may be formed to be adjacent to the central LED lens 205 at one side of the central LED lens 205. The supporting member 210 is formed in a direction where the plurality of LED lenses 201 protrude.

Though not illustrated, the LED lens array 200" may be formed not to include the supporting member 210.

Figure 14:
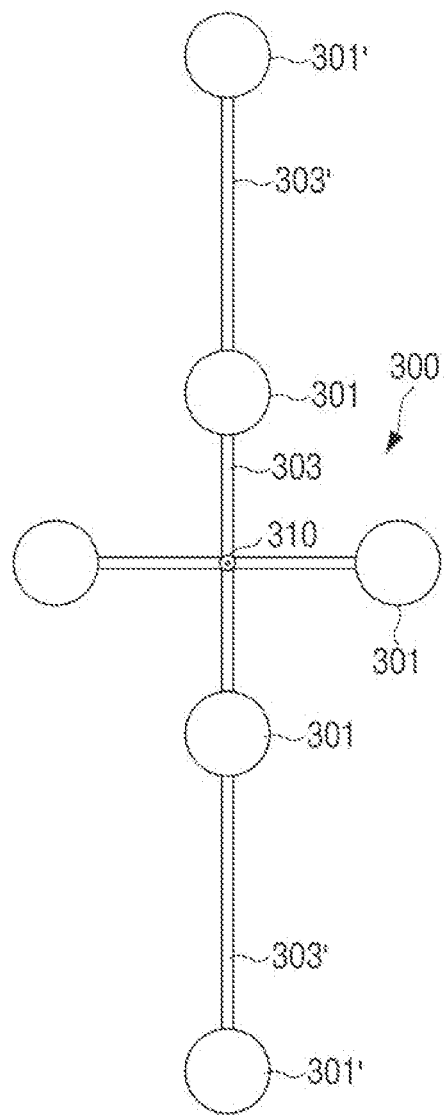
FIG. 14 is a plan view illustrating the LED lens array for a direct type backlight device according to another embodiment.

FIG. 14 is a plan view illustrating the LED lens array for a direct type backlight device according to another embodiment.

Referring to FIG. 14, the LED lens array 300 according to one embodiment may include six LED lenses 301, 301' and four lens strings 303, 303' connecting the six LED lenses 301, 301' disposed in a cross-shape.

The four LED lenses 301 may be disposed in a cross-shape like the LED lens 201 of the LED lens arrays 200, 200' shown in FIGS. 11 and 12, and may be connected by two crossing lens strings 303. Therefore, the two lens strings 303 may form a cross-shape. A supporting member 310 supporting the diffuser plate 21 may be provided at the center of the two lens strings 303.

An additional LED lens 301' may be connected to each of the two LED lenses 301 facing each other among the four LED lenses 301, through an extension lens string 303'. For example, as shown in FIG. 14, the first additional LED lens 301' may be connected to the LED lens 301 located on an upper part through a first extension lens string 303', and a second additional LED lens 301' may be connected to the LED lens 301 located below through a second extension lens string 303'.

Accordingly, the upper LED lens 301 and the lower LED lens 301 may be connected to the two LED lenses 301, 301' through two lens strings 303, 303'. The upper LED lens 301 may be connected to the lower LED lens 301 through the lens string 303, and may be connected to the first additional LED lens 301' through the first extension lens string 303'. The lower LED lens 301 may be connected to the upper LED lens 301 through the lens string 303, and may be connected to the second additional LED lens 301' through the second extension lens string 303'.

Guiding the light emitted from the LED lenses 301, 301' by the lens string 303 and the extension lens string 303' of FIG. 14 is the same or similar to the lens string 103 of the LED lens array 100 of the above embodiment and thus, the detailed description will be omitted.

Though not illustrated, as another example, the LED lens array 300 of FIG. 14 may be formed not to include the supporting member 310.

Figure 15:
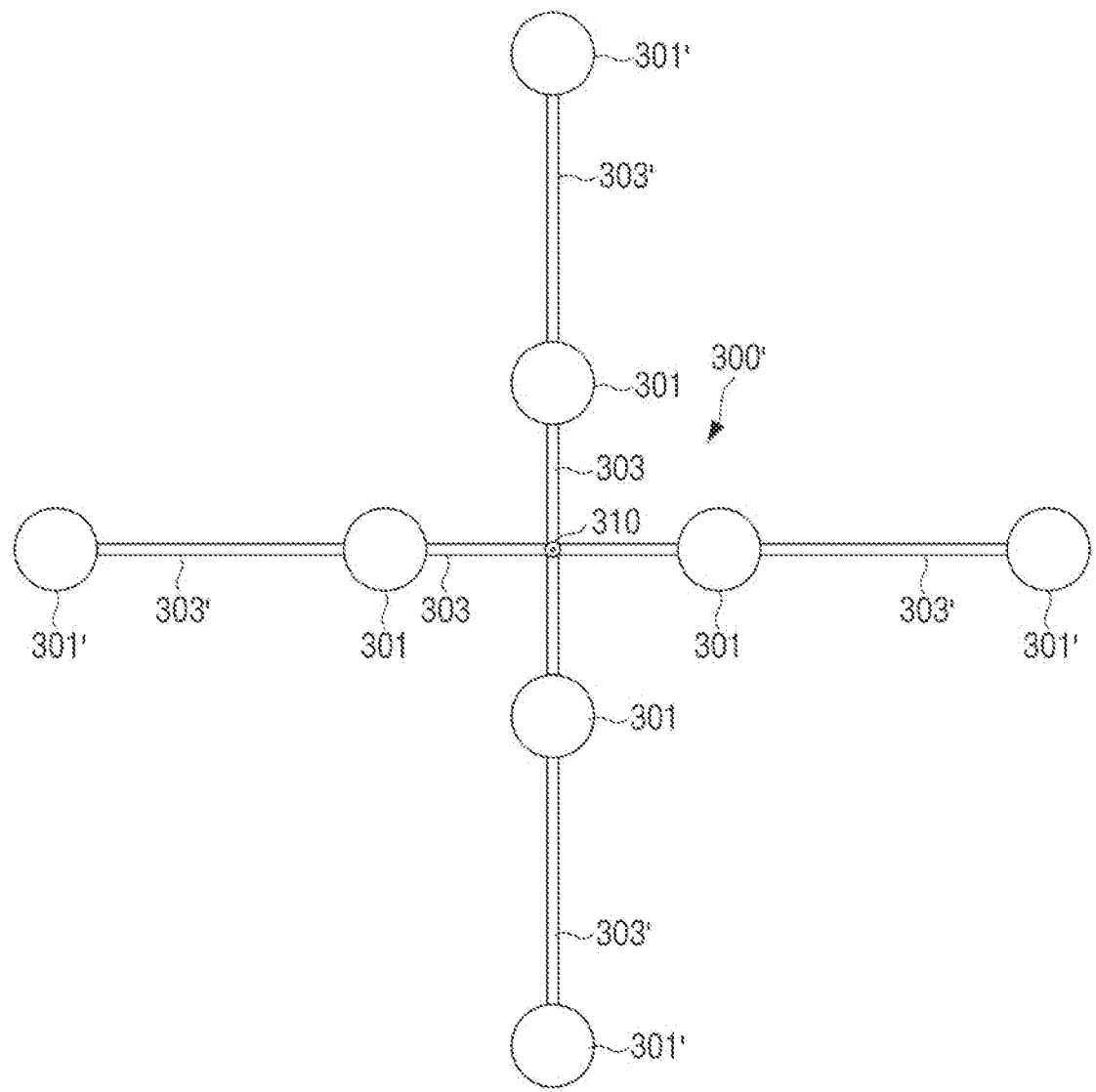
FIG. 15 is a plan view illustrating the LED lens array for a direct type backlight device according to another embodiment.

FIG. 15 is a plan view illustrating the LED lens array for a direct type backlight device according to another embodiment.

Referring to FIG. 15, the LED lens array 300' according to an embodiment may include eight LED lens 301 and 301' disposed in a cross shape and six lens strings 303 and 303' connecting the eight LED lenses 301 and 301'.

The LED lens array 300' as illustrated in FIG. 15 is different from the LED lens array 300 of FIG. 14 in that the additional LED lens 301' is installed at one side of the left LED lens 301 and the right LED lens 301.

The additional LED lens 301' installed on the left side of the left LED lens 301 may be connected to the extension lens string 303', and the additional LED lens 301' installed on the right side of the right LED lens 301 may be connected to the extension lens string 303'. However, the detailed description is omitted since the LED lens array 300''s is the same as the LED lens array 300 of FIG. 14 except the foregoing.

Figure 16:
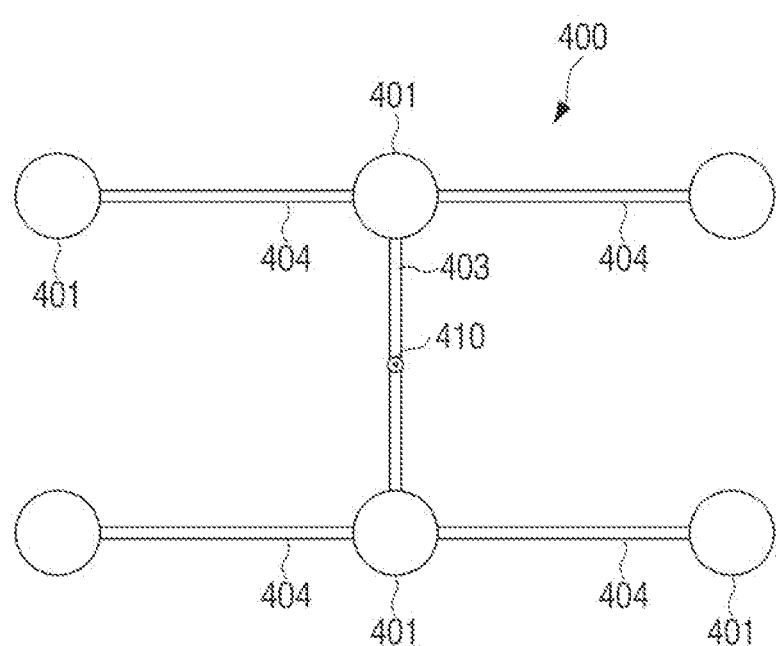
FIG. 16 is a plan view illustrating the LED lens array for a direct type backlight device according to another embodiment.

FIG. 16 is a plan view illustrating the LED lens array for a direct type backlight device according to another embodiment.

Referring to FIG. 16, an LED lens array 400 includes six LED lenses 401 and five lens strings 403, 404.

The plurality of lens strings 403, 404 may include a vertical lens string 403 and a horizontal lens string 404. The vertical lens string 403 may be formed to connect two LED lenses 401 adjacent in a vertical direction among six LED lenses 401.

The horizontal lens string 404 extends left and right in each of the two LED lenses 401 connected by the vertical lens string 403, and may be formed to connect two adjacent LED lenses in a horizontal direction among the six LED lenses 401. In other words, the LED lens 401 located on the upper part may be connected to the two LED lenses 401 located on the left and right sides through two horizontal lens strings 404. The LED lens 401 located in the lower part may be connected to the two LED lenses 401 located on the left and right sides through two horizontal lens strings 404. Accordingly, the LED lens array 400 shown in FIG. 16 includes one vertical lens string 403 and four horizontal lens strings 404.

The vertical lens string 403 may be provided with the supporting member 410 supporting the diffuser plate 21 in a direction where the plurality of LED lenses 401 protrude. The supporting member 410 may be installed at the center of the vertical lens string 403.

Since guiding the light emitted from the LED lens 401 by the vertical lens string 403 and the horizontal lens string 404 of the LED lens array 400 of FIG. 16 is the same or similar with the lens string 103 of the LED lens array 100, and the detailed description thereof is omitted.

Figure 17:
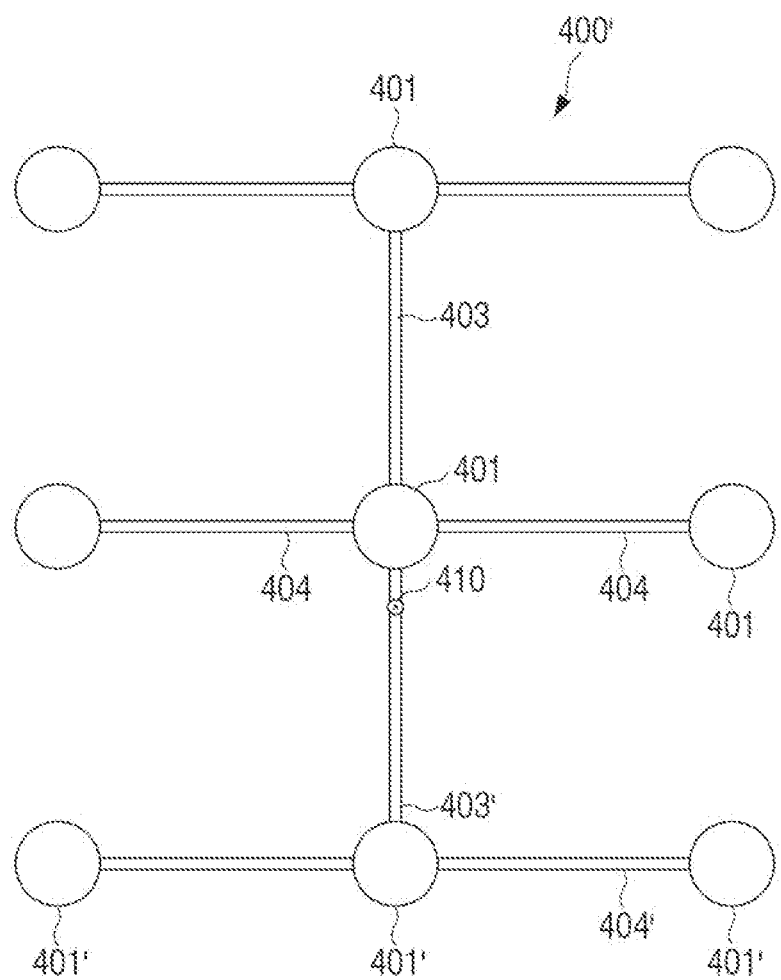
FIG. 17 is a plan view illustrating the LED lens array for a direct type backlight device according to another embodiment.

FIG. 17 is a plan view illustrating the LED lens array for a direct type backlight device according to another embodiment.

Referring to FIG. 17, an LED lens array 400' includes nine LED lenses 401 and eight lens strings 403, 404.

The LED lens array 400' of FIG. 17 is in a shape that the LED lens array 400 of FIG. 16 is connected with three consecutive LED lenses 401' as illustrated in FIG. 2 by using the extension vertical lens string 403'.

For example, one of two LED lenses 401 connected by the vertical lens string 403 as shown in FIG. 16 is connected with an LED lens 401' spaced apart therefrom by the extension vertical lens string 403'. In the embodiment of FIG. 17, the lower LED lens 401 and the additional LED lens 401' are connected by using the extension vertical lens string 403'. The additional LED lens 401' connected to the extension vertical lens string 403' may be connected to two additional LED lenses 401' disposed adjacent to the left by an extension horizontal lens string 404'. The extension horizontal lens string 404' may be disposed in parallel with the horizontal lens string 404 described above.

In the above description, the vertical lens string 403 and the extension vertical lens string 403' are the same, and the horizontal lens string 404 and the extension horizontal lens string 404' are the same, and the LED lens array 400' as illustrated in FIG. 17 includes two vertical lens string 403 and six horizontal lens string 404. The vertical lens string 403 and the horizontal lens string 404 may be formed in the same manner.

In the vertical lens string 403, the supporting member 410 supporting the diffuser plate 21 may be provided in a direction where the plurality of LED lenses 401 protrude. The supporting member 410 may be installed in the vertical lens string 403 so as to be adjacent to the LED lens 401 located at the center.

Guiding the light emitted from the LED lenses 401, 401' by the vertical lens string 403, extension vertical lens string 403', horizontal lens string 404, and extension horizontal lens string 404' of the LED lens array 400' is the same or similar with the lens string 103 of the LED lens array 100 of the above example and thus, the detailed description will be omitted.

A display device including an LED lens array for a direct type backlight device will be described with reference to FIG. 18.

Figure 18:
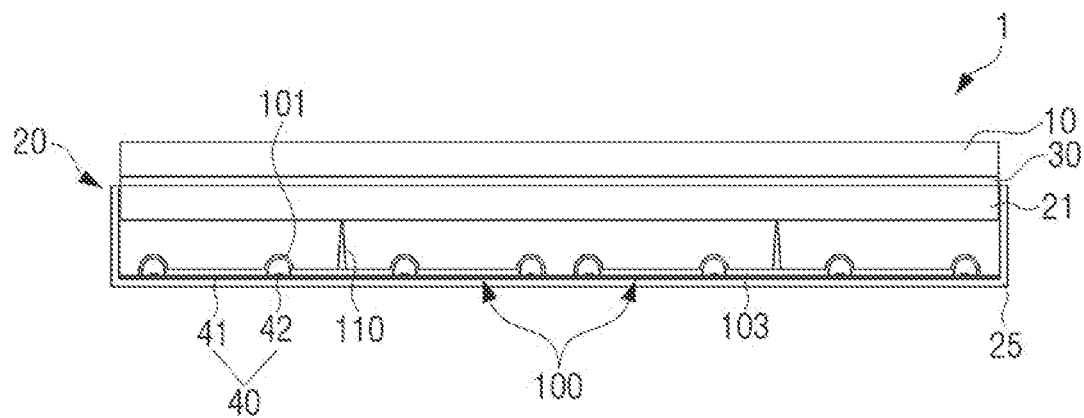
FIG. 18 is a cross-sectional view schematically illustrating a display device including an LED lens array for a direct type backlight device according to an embodiment.
Figure 19:
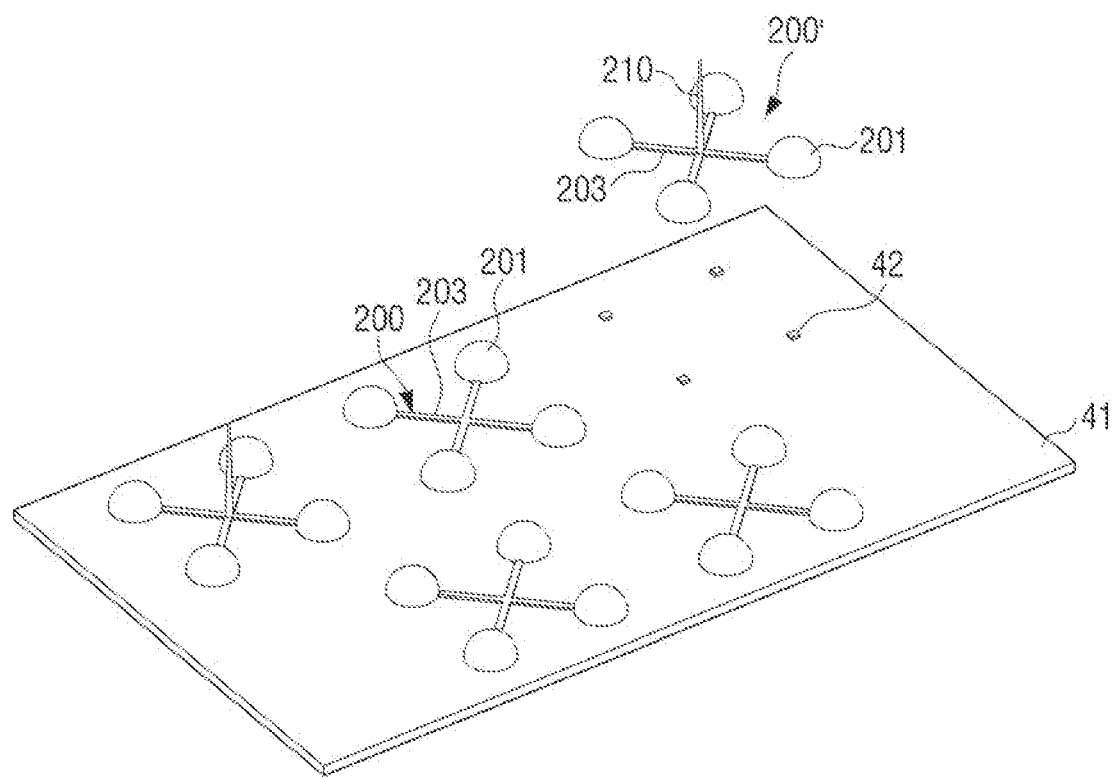
FIG. 19 is a perspective view illustrating a printed circuit board installed with an LED lens array for a direct type backlight device according to an embodiment.

FIG. 18 is a cross-sectional view schematically illustrating a display device including an LED lens array for a direct type backlight device according to an embodiment. FIG. 19 is a perspective view illustrating a printed circuit board installed with an LED lens array for a direct type backlight device according to an embodiment.

Referring to FIG. 18, a display device 1 according to an embodiment may include a display panel 10 on which an image is displayed, a backlight device 20 for supplying light to the display panel 10, and an optical sheet 30 installed between the display panel 10 and the backlight device 20 for improving an optical characteristic provided by the backlight device 20.

The display panel 10 may be formed of a liquid crystal display panel and may display an image by receiving light from the backlight device 20 installed at a back side.

The backlight device 20 may include the diffuser plate 21 formed as a rectangular plate shape to correspond to the display panel 10, a light source 40 disposed above a lower chassis 25 below the diffuser plate 21 for emitting light toward the diffuser plate 21, and the lower chassis 25 for accommodating the diffuser plate 21 and the light source 40.

The diffuser plate 21 may be formed of a transparent resin material capable of guiding and diffusing light emitted from the light source 40.

The light source 40 may include the printed circuit board 41, a plurality of LEDs 42 provided at an upper surface of the printed circuit board 41, and a plurality of LED lens arrays 100 covering the plurality of LEDs 42.

Referring to FIG. 19, the plurality of LEDs 42 may be disposed with a predetermined pattern on an upper surface of the printed circuit board 41. Referring to the embodiment of FIG. 19, the plurality of LEDs 42 are arranged in a cross shape.

The LED lens arrays 200, 200' in a cross shape as illustrated in FIGS. 11 and 12 are installed to cover the plurality of LEDs 42 on an upper surface of the printed circuit board 41. Some of the plurality of LED lens arrays 200, 200' may include a supporting member 210 for supporting the diffuser plate 21 such as the LED lens array 200' as illustrated in FIG. 12, and other LED lens arrays 200 may not include the supporting member 210 as the LED lens array 200 of FIG. 11.

The LED lens arrays 200, 200' installed on the printed circuit board 41 as illustrated in FIG. 19 are merely an example, and LED lens arrays of various shapes may be used according to the disposition of the plurality of LEDs 42 provided on the printed circuit board 41.

A reflection sheet for reflecting light emitted from the plurality of LEDs 42 may be provided on an upper surface of the printed circuit board 41. The reflection sheet may include a plurality of through-holes so that the plurality of LED lenses 101 and the supporting member 110 are exposed.

The lower chassis 25 may be formed of a metal material so that heat generated from a plurality of LEDs 42 or the printed circuit board 41 or the like may be radiated to the outside easily.

The optical sheet 30 is for improving the optical feature of light incident on the display panel 10, and may include high brightness prism sheet, a diffuser sheet, or the like.

Referring to FIG. 19, the printed circuit board 41 having a shape and size corresponding to the diffuser plate 21 being used for a backlight device is illustrated, but the printed circuit board 41 is not limited thereto.

The printed circuit board may be formed to be a thin rod shape to reduce a manufacturing cost of the printed circuit board.

Figure 20:
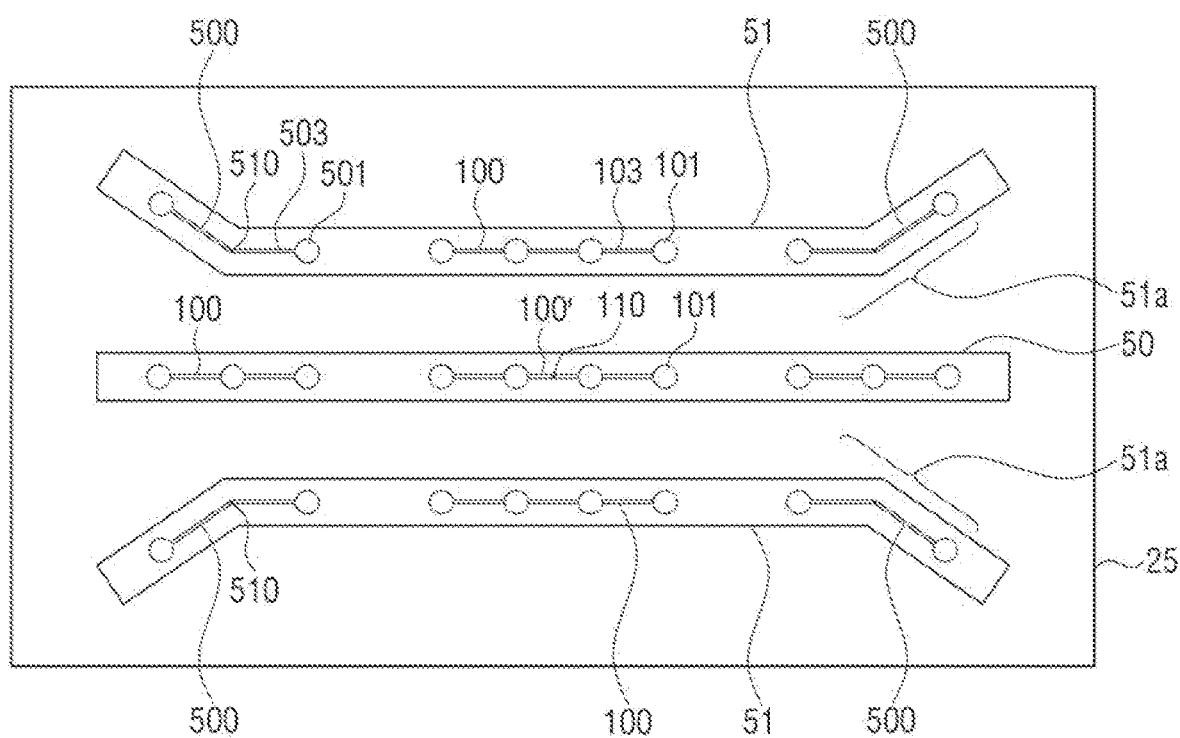
FIG. 20 is a plan view illustrating a printed circuit board installed with an LED lens array for a direct type backlight device according to another embodiment.

FIG. 20 is a plan view illustrating a lower chassis where a printed circuit board in a rod shape installed with an LED lens array for a direct type backlight device is installed according to another embodiment.

As illustrated in FIG. 20, three rod-shaped printed circuit boards 50, 51 may be provided in the lower chassis 25. Since a plurality of LEDs 42 are arranged in the form of straight line on the printed circuit boards 50, 51, the LED lens array 100 may use a straight line-shaped LED lens array 100 as shown in FIGS. 1 and 2. Some LED lens arrays 100' may include the supporting member 110 supporting the diffuser plate 21.

The upper printed circuit board 51 and the lower printed circuit board 51 may include a bending portion 51a which is bent toward a corner of the lower chassis 25 at left and right ends. The plurality of LEDs (not shown) provided on the bending portion 51a of the upper and lower printed circuit boards 51 may be arranged in a bent shape.

Figure 21:
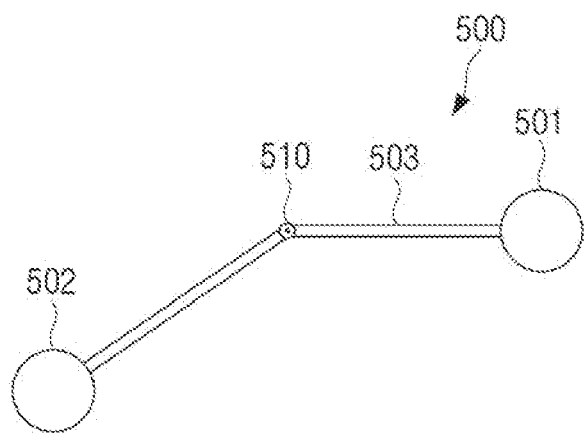
FIG. 21 is a plan view illustrating an example of an LED lens array used for the printed circuit board of FIG. 20.

The LED lens array 500 according to an embodiment may be formed to be a bent shape as illustrated in FIG. 21 to correspond to a plurality of LEDs in a bent shape.

FIG. 21 is a plan view illustrating an example of an LED lens array used for the printed circuit board of FIG. 20.

As illustrated in FIG. 21, the lens string 503 connecting the first LED lens 501 and the second LED lens 502 may be formed in a bent shape. At the bent portion of the lens string 503, a supporting member 510 supporting the diffuser plate 21 may be provided.

According to the LED lens array for the direct type backlight device, an LED lens array of the number less than the plural of LEDs provided on a printed circuit board may be used and thus, the number of parts may be reduced. Therefore, there is an advantage to reduce man-hour of a process of attaching an LED lens.

According to the LED lens array for a direct type backlight device according to an embodiment, a plurality of LED lenses are connected by a plurality of lens strings and there is an advantage that distortion of an LED lens relative to an LED during a manufacturing process may be reduced.

The disclosure has been shown and described with reference to various embodiments thereof. The terminology used herein is for the purpose of description and should not be construed as limiting. Various modifications and variations are possible in accordance with the above teachings. Therefore, unless stated otherwise, the disclosure can be practiced freely within the scope of the claims.

What is claimed is:

1. A light emitting diode (LED) lens array for a backlight device, comprising:
   a plurality of LED lenses disposed on a plane;
   a plurality of lens strings connecting the plurality of LED lenses; and
   a supporting member provided at one of the plurality of lens strings and protruding in a direction where the plurality of LED lenses protrude,
   wherein each of the plurality of lens strings extends from side surfaces of each of the plurality of LED lenses, and is configured to allow light emitted from each of the plurality of LED lenses to pass therethrough, wherein a width of each of the plurality of lens strings is smaller than a diameter of each of the plurality of LED lenses, and
   wherein a lens string provided with the supporting member includes a portion which corresponds to a lower end of the supporting member and which is provided with a reflector reflecting light guided through the lens string toward the supporting member.

2. The LED lens array for a backlight device of claim 1, wherein the supporting member is formed of a conical shape that an upper end has small area and the lower end has large area.

3. The LED lens array for a backlight device of claim 1, wherein each of the plurality of lens strings connects a pair of LED lenses, and is formed to guide light emitted from each of the pair of LED lenses between the pair of LED lenses.

4. The LED lens array for a backlight device of claim 1, wherein each of the plurality of lens strings connects a pair of LED lenses, and is formed to emit a part of light emitted from each of the pair of LED lenses to an outside and to guide another part of light emitted from each of the pair of LED lenses between the pair of LED lenses.

5. The LED lens array for a backlight device of claim 1, wherein the plurality of LED lenses are disposed in a row, and
wherein each of the plurality of lens strings are provided as a rod in a straight line shape between two adjacent LED lenses among the plurality of LED lenses.

6. The LED lens array for a backlight device of claim 1, wherein the plurality of LED lenses are disposed in a cross shape, and
wherein the plurality of lens strings are formed in a cross shape.

7. The LED lens array for a backlight device of claim 6, wherein the supporting member is provided at a center of the plurality of lens strings formed in a cross shape in the direction where the plurality of LED lenses protrude.

8. The LED lens array for a backlight device of claim 6, wherein a central LED lens is provided at a center of the plurality of lens strings formed in a cross shape.

9. The LED lens array for a backlight device of claim 1, wherein the plurality of lens strings comprise:
a vertical lens string configured to connect two LED lenses adjacent in a vertical direction among the plurality of LED lenses; and
a plurality of horizontal lens strings that are extended to left and right from the two LED lenses connected to the vertical lens string, and connect two LED lenses adjacent in a horizontal direction among the plurality of LED lenses, respectively.

10. The LED lens array for a backlight device of claim 9, wherein the plurality of lens strings further comprise:
an extension vertical lens string configured to connect an LED lens spaced apart from one of the two LED lenses connected by the vertical lens string; and
an extension horizontal lens string configured to be extended from the LED lens connected to the extension vertical lens string, and connect two LED lenses adjacent in the horizontal direction to be parallel with the extension horizontal lens string.

11. A display device comprising:
a lower chassis;
a printed circuit board that is installed at an upper surface of the lower chassis and provided with a plurality of LEDs; and
an LED lens array for a backlight device installed on the printed circuit board to cover the plurality of LEDs,
wherein the LED lens array for the backlight device comprises:
a plurality of LED lenses to cover the plurality of LEDs;
a plurality of lens strings for connecting the plurality of LED lenses; and
a supporting member provided at one of the plurality of lens strings and protruding in a direction where the plurality of LED lenses protrude,
wherein each of the plurality of lens strings is extended from side surfaces of each of the plurality of LED lenses, formed so as to enable light emitted from each of the plurality of LED lenses to pass therethrough, and a width of the plurality of lens strings is smaller than a diameter of each of the plurality of LED lenses, and
wherein a lens string provided with the supporting member includes a portion which corresponds to a lower end of the supporting member and which is provided with a reflector reflecting light guided through the lens string toward the supporting member.

12. The display device of claim 11, further comprising:
a diffuser plate installed at an upper side of the plurality of LEDs.

* * * * *